US011316908B1

(12) United States Patent
Chakraborty et al.

(10) Patent No.: US 11,316,908 B1
(45) Date of Patent: Apr. 26, 2022

(54) BACNET CONVERSION OF WATER MANAGEMENT DATA FOR BUILDING MANAGEMENT SOLUTIONS

(71) Applicant: Zurn Industries, LLC, Milwaukee, WI (US)

(72) Inventors: Arindam Chakraborty, Milwaukee, WI (US); Richard Ryer, Milwaukee, WI (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 17/163,774

(22) Filed: Feb. 1, 2021

(51) Int. Cl.
| | |
|---|---|
| *H04L 65/102* | (2022.01) |
| *F24F 11/30* | (2018.01) |
| *F24F 11/56* | (2018.01) |
| *E03B 7/07* | (2006.01) |
| *H04L 67/12* | (2022.01) |

(52) U.S. Cl.
CPC ............. *H04L 65/102* (2013.01); *E03B 7/07* (2013.01); *F24F 11/30* (2018.01); *F24F 11/56* (2018.01); *H04L 67/12* (2013.01)

(58) Field of Classification Search
None
See application file for complete search history.

(56) References Cited

U.S. PATENT DOCUMENTS

| 4,563,780 A | 1/1986 | Pollack |
| 4,805,247 A | 2/1989 | Laverty, Jr. |

(Continued)

FOREIGN PATENT DOCUMENTS

| CA | 2942987 A1 | 9/2015 |
| JP | 2002021149 A2 | 1/2002 |

(Continued)

OTHER PUBLICATIONS

Base Line, BACnet Manager, Brochure, website: https://www.baselinesystems.com/mediafiles//pdf/BACnet_B_Brochure_Web.pdf Publicly available at least as early as Feb. 1, 2021, (2 Pages).

(Continued)

*Primary Examiner* — Mohammad Ali
*Assistant Examiner* — Kelvin Booker
(74) *Attorney, Agent, or Firm* — Michael Best & Friedrich LLP

(57) ABSTRACT

Methods and systems of monitoring and managing a facility including a plurality of end point devices. One system includes a first gateway device. The first gateway device includes a first electronic processor configured to receive fixture data from at least one electro-mechanical element of a fixture associated with the facility, the fixture data related to an operation of the fixture, and enable transmission of the fixture data to a remote device for virtual processing. The system also includes a second gateway device communicatively coupled with the first gateway device. The second gateway device includes a second electronic processor configured to receive, from the first gateway device, the processed fixture data. The second electronic processor configured to convert the processed fixture data pursuant to a networking protocol associated with a building management system and transmit the converted fixture data for display via a visual dashboard associated with the building management system.

19 Claims, 11 Drawing Sheets

(56) References Cited

U.S. PATENT DOCUMENTS

| | | | |
|---|---|---|---|
| 5,217,035 A | 6/1993 | Van Marcke | |
| 5,438,714 A | 8/1995 | Shaw | |
| 5,612,890 A | 3/1997 | Strasser et al. | |
| 5,844,808 A | 12/1998 | Konsmo et al. | |
| 6,018,827 A | 2/2000 | Shaw et al. | |
| 6,038,519 A | 3/2000 | Gauthier et al. | |
| 6,189,163 B1 | 2/2001 | Van Marcke | |
| 6,236,953 B1 | 5/2001 | Segal | |
| 6,337,635 B1 | 1/2002 | Erockson et al. | |
| 6,347,414 B2 | 2/2002 | Contadini et al. | |
| 6,411,920 B1 | 6/2002 | McConnell et al. | |
| 6,583,720 B1 | 6/2003 | Quigley | |
| 6,694,177 B2 | 2/2004 | Eggers et al. | |
| 6,749,122 B1 | 6/2004 | Koenck et al. | |
| 6,766,221 B1 | 7/2004 | Christiansen | |
| 6,769,443 B2 | 8/2004 | Bush | |
| 6,956,498 B1 | 10/2005 | Gauthier et al. | |
| 7,562,380 B2 | 7/2009 | Negishi et al. | |
| 9,476,188 B2 | 10/2016 | Peel | |
| 9,501,613 B1 | 11/2016 | Hamson et al. | |
| 9,594,366 B2 | 3/2017 | Klein et al. | |
| 9,817,383 B1 | 11/2017 | Sinha et al. | |
| 10,047,974 B1 | 8/2018 | Riblet et al. | |
| 10,110,679 B2 | 10/2018 | Chandhoke et al. | |
| 10,200,474 B2 | 2/2019 | Zhang et al. | |
| 10,303,509 B2 | 5/2019 | Qiao et al. | |
| 10,323,860 B1 | 6/2019 | Riblet et al. | |
| 10,361,802 B1 | 7/2019 | Hoffberg-Borghesani et al. | |
| 10,411,984 B2 | 9/2019 | Hoglund | |
| 10,474,613 B1* | 11/2019 | Dunn | H04W 12/128 |
| 10,480,825 B1 | 11/2019 | Riblet et al. | |
| 10,520,210 B2 | 12/2019 | Park et al. | |
| 10,673,645 B2 | 6/2020 | Ansari et al. | |
| 10,823,458 B1 | 11/2020 | Riblet et al. | |
| 10,945,109 B2 | 3/2021 | Nies et al. | |
| 11,076,015 B2 | 7/2021 | Isberg | |
| 11,108,865 B1* | 8/2021 | Chakraborty | H04L 67/22 |
| 11,221,601 B1 | 1/2022 | Chakraborty et al. | |
| 2002/0099454 A1 | 7/2002 | Gerrity | |
| 2010/0324962 A1 | 12/2010 | Nesler et al. | |
| 2016/0239001 A1* | 8/2016 | Chin | F24F 11/30 |
| 2017/0284691 A1* | 10/2017 | Sinha | F24F 11/62 |
| 2017/0322534 A1* | 11/2017 | Sinha | G05B 19/0426 |
| 2017/0329292 A1* | 11/2017 | Piaskowski | G06Q 10/00 |
| 2018/0067635 A1* | 3/2018 | Zummo | H04L 12/2823 |
| 2018/0076978 A1* | 3/2018 | Schubert | H04L 12/2832 |
| 2018/0101158 A1* | 4/2018 | Guthrie | G05B 15/02 |
| 2018/0102954 A1* | 4/2018 | Schubert | H04L 12/4625 |
| 2018/0102958 A1* | 4/2018 | Guthrie | G06Q 10/20 |
| 2018/0119975 A1* | 5/2018 | Park | G06F 21/602 |
| 2018/0164993 A1* | 6/2018 | Zummo | G06F 3/0482 |
| 2018/0232031 A1* | 8/2018 | Swierk | H04L 67/12 |
| 2018/0232422 A1 | 8/2018 | Park et al. | |
| 2018/0234266 A1* | 8/2018 | Rudolph | H04L 65/102 |
| 2018/0234318 A1* | 8/2018 | Cox | H04L 43/0823 |
| 2018/0234326 A1* | 8/2018 | Swierk | H04L 43/16 |
| 2018/0234489 A1* | 8/2018 | Hammons | H04L 67/12 |
| 2018/0234519 A1* | 8/2018 | Boyapalle | H04L 41/0806 |
| 2018/0238577 A1 | 8/2018 | Drees et al. | |
| 2018/0253569 A1* | 9/2018 | Swierk | G06F 21/86 |
| 2018/0275625 A1* | 9/2018 | Park | G05B 19/052 |
| 2018/0293864 A1* | 10/2018 | Wedig | G08B 21/182 |
| 2018/0299840 A1* | 10/2018 | Sinha | G05B 15/02 |
| 2018/0313561 A1* | 11/2018 | Sinha | F24F 11/54 |
| 2018/0313564 A1* | 11/2018 | Gavin | G06F 15/76 |
| 2018/0347843 A1 | 12/2018 | Friedenberger et al. | |
| 2018/0364654 A1 | 12/2018 | Locke et al. | |
| 2019/0041829 A1* | 2/2019 | Sinha | H04L 43/06 |
| 2019/0149618 A1* | 5/2019 | Tsai | H04L 12/66 709/202 |
| 2019/0162438 A1 | 5/2019 | Fokou et al. | |
| 2019/0347622 A1 | 11/2019 | Elbsat et al. | |
| 2019/0377305 A1 | 12/2019 | Petrus et al. | |
| 2020/0050753 A1* | 2/2020 | Davis | G01R 22/10 |
| 2020/0090289 A1 | 3/2020 | Elbsat et al. | |
| 2020/0096985 A1 | 3/2020 | Wenzel et al. | |
| 2020/0113015 A1 | 4/2020 | Basu et al. | |
| 2020/0128566 A1 | 4/2020 | Wei et al. | |
| 2020/0399873 A1 | 12/2020 | Chakraborty et al. | |
| 2020/0409883 A1 | 12/2020 | Dixit et al. | |
| 2021/0018205 A1 | 1/2021 | Ellis et al. | |
| 2021/0018210 A1* | 1/2021 | Nasis | F24F 11/89 |
| 2021/0140159 A1 | 5/2021 | DesErmia et al. | |
| 2021/0144210 A1 | 5/2021 | Kolhaoure et al. | |
| 2021/0176319 A1* | 6/2021 | Leannah | H04L 12/2818 |
| 2021/0182228 A1 | 6/2021 | Dixit et al. | |
| 2021/0200164 A1 | 7/2021 | Ploegert et al. | |
| 2021/0208611 A1 | 7/2021 | Trikha et al. | |

FOREIGN PATENT DOCUMENTS

| | | | | |
|---|---|---|---|---|
| KR | 2002-0033927 A | * | 5/2002 | G06Q 50/26 |
| KR | 2005-0081019 A | * | 8/2005 | H04L 12/24 |
| KR | 10-1722458 B1 | * | 4/2017 | H04W 4/12 |

OTHER PUBLICATIONS

Base Line, FMLink website: https://www.fmlink.com/articles/baseline-lawn-irrigation-system-bacnet/, Aug. 31, 2018, (3 Pages).

Badger Meter, Utility Water & Wastewater Solutions/Commercial & Industrial measurement Solutions, website: https://www.badgermeter.com/en-gb, Copyright 2020, (6 Pages).

Comptech, Metering Solutions for Energy Suppliers, website: https://www.multical.hu/BACnet_modul_datasheet.pdf, Copyright 2020, (1 Page).

Wikipedia, Building Management System, website: https://en.wikipedia.org/wiki/Building_management_system, Publicly available at least as early as Feb. 1, 2021, but page last edited Mar. 12, 2021, (2 Pages).

* cited by examiner

BACNET CONVERSION OF WATER MANAGEMENT DATA FOR BUILDING MANAGEMENT SOLUTIONS

FIELD

Embodiments relate to monitoring and managing a facility having a plurality of end point devices, and, more particularly, to a BACnet conversion of water management data for building management solutions.

SUMMARY

In the field of facility or building management, there is a desire to monitor performance of restroom fixtures, such as, for example, faucets, flush valves, hand dryers, floor drains, air or room quality sensors, backflow preventers, bottle fillers, pressure sensors, leak detection sensors, occupancy detection sensors, resource dispensers (for example, a soap dispenser, a sanitizer dispenser, a room deodorizer dispenser, a paper tower dispenser), and the like. As one example, a building manager may want to monitor water usage or consumption for one or more restroom facilities within the building. Such monitoring may be performed for predictive maintenance, alerting, for collecting data on usage of the restroom(s), or the like. For example, monitoring may indicate that there is a certain percentage of life remaining for a flush valve (or a component of the flush valve) based on a rated life of flushes and a number of flush operations performed by the flush valve. As another example, monitoring may generate alerts, such as a low soap alert, a backflow discharge in progress alert, a drain clogged alert, and the like.

The embodiments described herein enable water management and efficient operation related data (for example, fixture data) to pass along to and integrate with building management solutions ("BMS") (including, for example, BACnet servers, computing devices, and the like). For example, the embodiments described herein include an Internet of Things ("IoT") architecture of fixtures (such as faucets, flush-vales, drains, and the like) that communicates (via end point devices and facility gateways) with a cloud network (for example, a cloud server or the like). The cloud network may then transmit the fixture data to a BACnet gateway device (for example, through LoRa WAN RF communication protocols). The BACnet gateway device then converts the fixture data and further transmits the data such that the data may be displayed on the BACnet visual dashboard designed by various BMS vendors.

For example, one embodiment provides a system for converting water management data for building management solutions. The system includes a first gateway device associated with a facility. The first gateway device includes a first electronic processor configured to receive fixture data from at least one electro-mechanical element of a fixture associated with the facility, the fixture data related to an operation of the fixture, and enable transmission of the fixture data to a remote device for virtual processing. The system also includes a second gateway device communicatively coupled with the first gateway device. The second gateway device includes a second electronic processor configured to receive, from the first gateway device, the processed fixture data. The second electronic processor configured to convert the processed fixture data pursuant to a networking protocol associated with a building management system and transmit the converted fixture data for display via a visual dashboard associated with the building management system.

Another embodiment provides a method for converting water management data for building management solutions. The method includes receiving, with a first electronic processor of a first gateway device associated with a facility, fixture data from at least one electro-mechanical element of a fixture associated with the facility, the fixture data related to an operation of the fixture. The method also includes enabling, with the first electronic processor of the first gateway device, transmission of the fixture data to a remote device for virtual processing. The method also includes receiving, with a second electronic processor of a second gateway device from the first gateway device, the processed fixture data. The method also includes converting, with the second electronic processor of the second gateway device, the processed fixture data pursuant to a networking protocol associated with a building management system. The method also includes transmitting, with the second electronic processor of the second gateway device, the converted fixture data for display via a visual dashboard associated with the building management system.

Yet another embodiment provides a non-transitory, computer-readable medium storing instructions that, when executed by an electronic processor, perform a set of functions. The set of functions includes receiving fixture data from at least one electro-mechanical element of a fixture associated with the facility, the fixture data related to an operation of the fixture. The set of functions also includes transmitting the fixture data to a remote device for virtual processing. The set of functions also includes receiving, from a first gateway device associated with the facility to a second gateway device associated with a building management system, the processed fixture data. The set of functions also includes converting the processed fixture data pursuant to a networking protocol associated with the building management system. The set of functions also includes transmitting the converted fixture data for display via a visual dashboard associated with the building management system.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
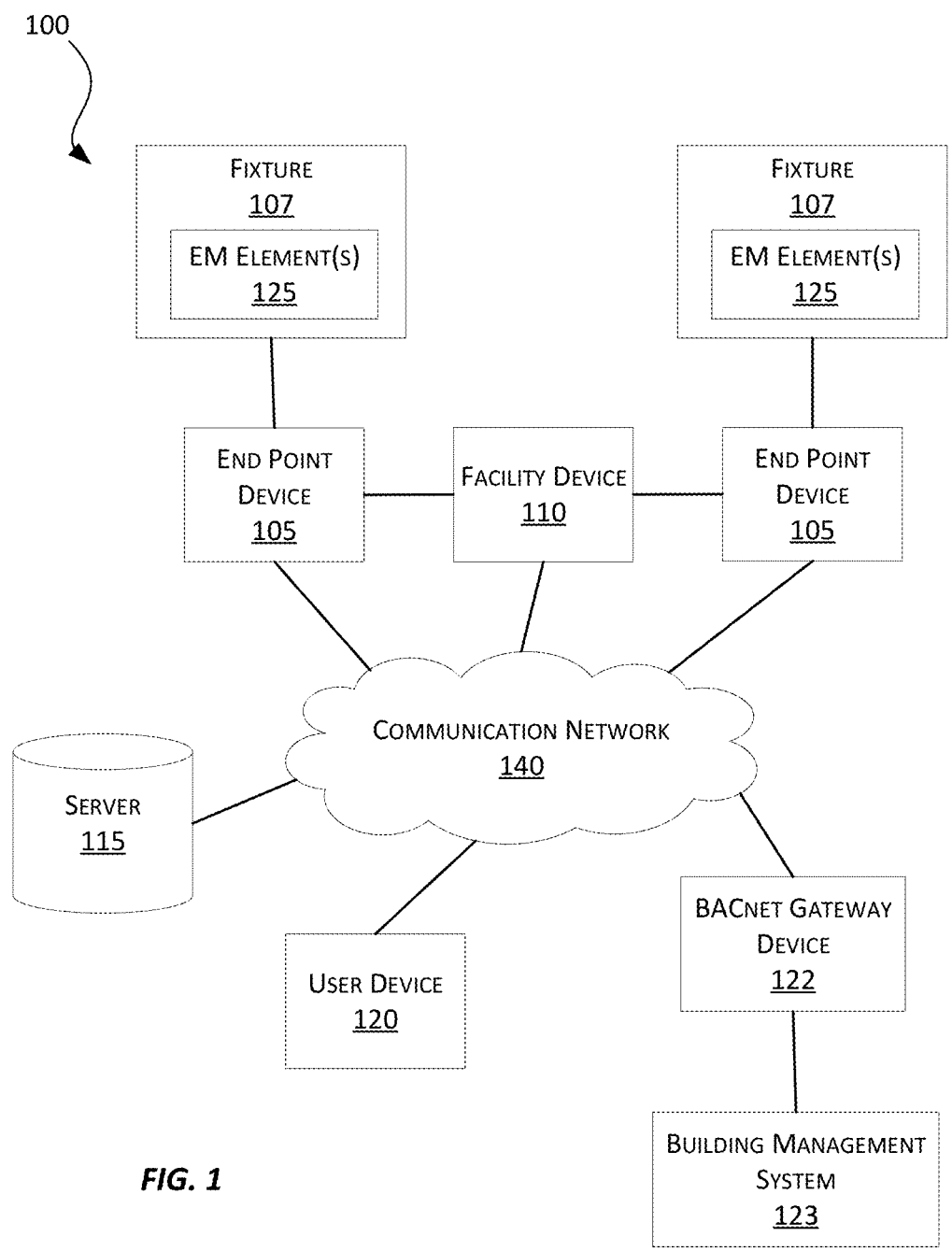
FIG. 1 schematically illustrates a system for monitoring and managing a facility having a plurality of end point devices according to some embodiments.

FIG. 1 illustrates a system 100 for monitoring and managing a facility (for example, a building or one or more rooms within a building) according to some embodiments. In the illustrated example, the system 100 includes a plurality of end point devices 105 (collectively referred to herein as "the end point devices 105" and individually as "an end point device 105"), a plurality of fixtures 107 (collectively referred to herein as "the fixtures 107" and individually as "a fixture 107"), a facility device 110 (for example, a gateway), a server 115 (for example, cloud server), a user device 120, a BACnet gateway device 122, and a building management system ("BMS") 123. In some embodiments, the system 100 includes fewer, additional, or different components than illustrated in FIG. 1 in various configurations. For example, the system 100 may include multiple facility devices 110, servers 115, user devices 120, BACnet gateway devices 122, or a combination thereof. Additionally, the system 100 may include any number of end point devices 105 and/or fixtures 107 and the two endpoint devices and fixtures illustrated in FIG. 1 are purely for illustrative purposes. Also, in some embodiments, one or more of the components of the system 100 may be distributed among multiple devices, combined within a single device, or a combination thereof. As one example, in some embodiments, one or more of the end point devices 105 may be incorporated within a fixture 107 as a single device. Accordingly, in some embodiments, the functionality described as being performed by the end point device 105 (or a portion thereof) may be performed by a fixture 107 (including built-in or attached similar hardware and software components as the end point device 105).

The end point devices 105, the fixtures 107, the facility device 110, the server 115, the user device 120, the BACnet gateway device 122, and the BMS 123 communicate over one or more wired or wireless communication networks 140. Portions of the communication networks 140 may be implemented using a wide area network ("WAN"), such as the Internet or a LoRa system, a local area network ("LAN"), such as a Bluetooth™ network or Wi-Fi, and combinations or derivatives thereof. Accordingly, components of the system 100 may be configured to communicate via Bluetooth, Wi-Fi, Zigbee, LTE/Cellular, wired ethernet, RS485/RS232, or the like. As one example, the end point devices 105 may communicate via LoRa with the facility device 110. Alternatively or in addition, in some embodiments, one or more components of the system 100 communicate directly as compared to through the communication network 140. For example, in some embodiments, the end point devices 105 communicate directly with the facility device 110. Also, in some embodiments, the components of the system 100 communicate through one or more intermediary devices not illustrated in FIG. 1.

Additionally, in some embodiments, one or more components of the system 100 communicate using LoRa or LoRaWAN networking protocols (for example, the end point device 105 and the facility device 110). Using such networking protocols provides for secure, encrypted communication of data without use of a customer or building network. Accordingly, use of such networking protocols may completely isolate an end point device 105 (or other component of the system 100) from a customer or building network.

A fixture 107 may include, for example, a faucet, a flushometer, a flush valve, a soap dispenser, a handwashing system, a water service line monitor, a backflow preventer, a floor drain, a hand dryer, a pressure sensor, a water use sensor, a flow sensor, a valve sensor, a lavatory, a toilet, a urinal, a water closet, a bottle and glass filler, a drain, a drinking water fountain, an air or room quality sensor (for example, may include a service request or product replenishment request button or other suitable activator), a backflow preventer, a leak detection sensor, an occupancy detection sensor, and a resource dispenser (for example, a soap dispenser, a sanitizer dispenser, a room deodorizer dispenser, a paper tower dispenser), and the like. Accordingly, in some embodiments, the fixture 107 provides a water management solution. As seen in FIG. 1, each of the fixtures 107 is associated with one or more electro-mechanical ("EM") elements 125. The EM elements 125 are configured to monitor and/or influence the operation of the fixture 107.

An EM element 125 may include, but is not limited to, an actuator, a flow sensor, a position sensor, a proximity sensor, a thermocouple, and the like. It is contemplated that the EM elements 125 may include an electrical only element, a mechanical only element, or a combination of an electrical and a mechanical element(s). The EM elements 125 may include a single-piece component or multiple components.

As one example, in some embodiments, the fixture 107 is a faucet having a sensor (for example, as a first EM element 125) configured to detect the presence of a person within a specified zone. When the sensor is triggered (for example, by detecting the presence of a person), the sensor sends an "ON" signal to an actuator (as a second EM element 125) (for example, a valve actuating solenoid) thereby allowing water to selectively flow through the faucet. When the sensor is no longer triggered (for example, by detecting the absence of a person), the sensor sends an "OFF" signal to the actuator to stop water flow through the faucet. In some embodiments, the actuator is configured to maintain the faucet in an open position for a predetermined period of time in response to receiving an "ON" signal. In such embodiments, the predetermined period of time may be set by a user or facility entity via, for example, the facility device 110, the user device 120, another component of the system 100, or a combination thereof.

As another example, in some embodiments, the fixture 107 is a flush valve having a sensor (for example, as a first EM element 125) configured to detect the presence of a person within a specified zone. When the sensor is triggered (for example, by detecting the presence of a person), the sensor sends an "ON" signal to the actuator (as a second EM element 125) (for example, a valve actuating solenoid) to actuate a valve and initiate a flow of water for a flushing event. The flush valve will then remain open for a predetermined period of time (for example, 5 seconds, 10 seconds, and the like) at least partially dependent upon an operating parameter set by the user via, for example, the facility device 110, the user device 120, another component of the system 100, or a combination thereof.

As yet another example, in some embodiments, the fixture 107 is a resource dispenser (such as a soap dispenser, a hand towel dispenser, and the like) having a sensor (for example, as a first EM element 125) configured to detect the presence of a person within a specified zone. When the sensor is triggered (for example, by the hands of a person), the sensor sends an "ON" signal to an actuator (for example, as a second EM element 125) to trigger a resource dispensing event (for example, actuation of a gear, a valve, or solenoid, and the like to initiate dispensing of a resource). The resource dispenser is configured to allow a predetermined volume or amount of a resource to be dispensed for each activation. In such embodiments, the volume or amount or timing of a resource to be dispensed may be set and adjusted by the user via, for example, the facility device 110, the user device 120, another component of the system 100, or a combination thereof.

The resource dispenser may also include a second sensor (for example, as a third EM element 125) to monitor the level or amount of resource remaining in a reservoir or receptacle. In some embodiments, the second sensor detects a current level or amount of resource in the reservoir or receptacle at a given moment in time. Alternatively or in addition, the second sensor may detect when the resource falls below a predetermined amount or level.

As yet another example, in some embodiments, the fixture 107 is a water service line monitor. The water service line monitor includes a sensor (for example, as a first EM element 125) configured to be retrofit onto an existing water service line and is configured to monitor the flow-rate of water therethrough, the presence of a backflow event, or a combination thereof. More specifically, the sensor may be configured to detect a flow rate, a presence of a backflow event, and the like.

As seen in FIG. 1, an end point device 105 generally includes a communication link with at least one fixture 107. The end point devices 105 may span multiple facilities, locations, rooms, and the like. In some embodiments, each of the end point devices 105 are associated with (located within) the same facility (for example, a restroom facility). However, in other embodiments, the end point devices 105 are associated with multiple facilities. As one example, a first end point device may be associated with a first facility, and a second end point device may be associated with a second different facility that is either in the same building as the first facility or in an entirely different building. Alternatively or in addition, in some embodiments, each of the end point devices 105 is associated with the same type of restroom fixture (for example, the fixture 107). However, in other embodiments, the end point devices 105 are associated with multiple different types of restroom fixtures (for example, the fixture 107). As one example, a first end point device may be associated with a faucet (as a first fixture 107) and a second end point device may be associated with a soap dispenser (as a second fixture 107).

Figure 2:
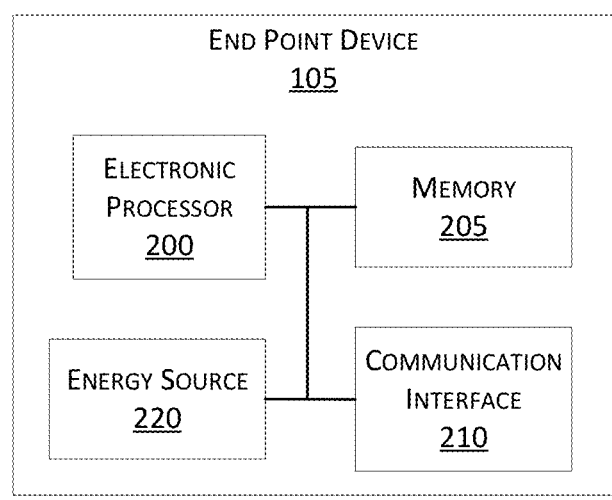
FIG. 2 schematically illustrates an end point device included in the system of FIG. 1 according to some embodiments.

FIG. 2 illustrates an end point device 105 according to some embodiments. In the illustrated example, the end point device 105 includes an electronic processor 200, a memory 205, a communication interface 210, and an energy source 220. The electronic processor 200, the memory 205, the communication interface 210, and the energy source 220 communicate wirelessly, over one or more communication lines or buses, or a combination thereof. In some embodiments, one or more components of the end point device 105 may be distributed among multiple devices, integrated into a single device, or a combination thereof. In some embodiments, the end point device 105 may perform additional functionality other than the functionality described herein. In some embodiments, the end point device 105 may include additional, different, or fewer components than those illustrated in FIG. 2 in various configurations. As one example, in some embodiments, the end point device 105 includes multiple energy sources 220. As another example, in some embodiments, the end point device 105 includes one or more expansion ports allowing for future expansion of the end point device 105. As one example, additional electro-mechanical (EM) elements of a fixture 107 may be connected to the end point device 105 via the one or more of the expansion ports.

The communication interface 210 allows the end point device 105 to communicate with devices external to the end point device 105. For example, as illustrated in FIG. 1, the end point device 105 may communicate with the fixture 107 (or an EM element 125 thereof), the facility device 110, the server 115, the user device 120, the BACnet gateway device 122, the BMS 123, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the communication interface 210 includes a port for receiving a wired connection between the facility device 110 and an EM element 125 of a corresponding fixture 107. As another example, in some embodiments, the communication interface 210 includes a radio or transceiver for establishing a wireless connection, over a LoRa system or network, between the end point device 105 and the facility device 110.

The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, in some embodiments, the electronic processor 200 is configured to enable management and/or monitoring of the operation of the corresponding fixture 107 either directly or indirectly (for example, via the EM element(s) 125 of the corresponding fixture 107). In some embodiments, the electronic processor 200 enables management and/or monitoring of the operation of a corresponding fixture 107 by receiving fixture data from the fixtures 107, converting the fixture data for transmission, and enabling transmission of the converted data to, for example, the facility device 110, the server 115, the user device 120, the BACnet gateway device 122, another component of the system 100, or a combination thereof.

Accordingly, in some embodiments, the electronic processor 200 is configured to interact with and collect data regarding an operation of a fixture 107 (as fixture data) via the EM elements 215 either directly or indirectly. In some embodiments, the end point device 105 is configured to remain in a sleep mode (or deep sleep mode) until an action or operation is detected with respect to a fixture 107 associated with the end point device 105 (for example, detecting the presence of a user). In response to detecting the action or operation, the end point device 105 may then wake-up to receive fixture data, convert the fixture data for transmission, and transmit the fixture data (in a minimum power consumption mode) to, for example, the facility device 110, the server 115, the user device 120, another component of the system 100, or a combination thereof. This results in optimized battery life for the product. As one example, in some embodiments, when the end point device 105 transmits the converted fixture data (for example, as one or more data packets) to the facility device 110, the transmission may occur through adaptable data rate, which automatically selects the most easily available channel such that the right channel does not have to be searched for, which further aids in the optimization of power.

As seen in FIG. 2, the end point device 105 also includes the energy source 220. The energy source 220 powers one or more components of the end point device 105, such as the electronic processor 200. The energy source 220 may be a battery, such as an energy efficient battery, a re-chargeable battery, a lithium-ion battery, a replaceable battery, or the like. As one example, the energy source 220 is a standard battery (for example, AAA, AA, C, D sized batteries). As noted above, in some embodiments, the end point device 105 includes multiple energy sources 220 (for example, a first energy source, a second energy source, and the like). In such embodiments, the multiple energy sources 220 may be of the same type, different types, or a combination thereof. As one example, the end point device 105 may include three AA batteries as the energy sources 220. Alternatively or in addition, the end point device 105 may be coupled to and receive power from a power source associated with the facility, the building, another component, or the like.

In some embodiments, one or more components of the system 100 may already be present in a completed fixture 107 (for example, a proximity sensor and an actuator in an automated faucet). In such embodiments, additional components may be retro-fit onto the existing fixture 107. Accordingly, in some embodiments, the end point device 105 (or components thereof) may be retro-fit onto or into the existing fixture 107. As one example, a transmitter, a receiver, a transceiver, or a combination thereof (as part of the communication interface 210), the electronic processor 200, the energy source 220, or a combination thereof may be mounted in the plumbing immediately upstream of a particular fixture 107. In other examples, the retro-fit may include updating firmware in the already existing device. In still other examples, the retro-fit may include integrating elements into a previously existing fixture 107.

Figure 3:
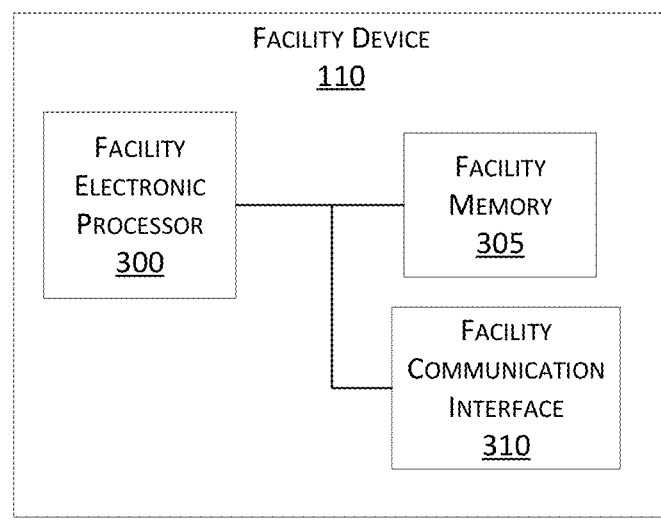
FIG. 3 schematically illustrates a facility device included in the system of FIG. 1 according to some embodiments.

FIG. 3 illustrates the facility device 110 according to some embodiments. In the illustrated example, the facility device 110 includes a facility electronic processor 300, a facility memory 305, and a facility communication interface 310. The facility electronic processor 300, the facility memory 305, and the facility communication interface 310 communicate wirelessly, over one or more communication lines or buses, or a combination thereof. The facility device 110 may include additional, different, or fewer components than those illustrated in FIG. 3 in various configurations. For example, in some embodiments, the facility device 110 includes a human-machine interface for interacting with a user. The human machine interface may include one or more input devices, one or more output devices, or a combination thereof. In some embodiments, one or more components of the facility device 110 may be distributed among multiple devices, integrated into a single device, or a combination thereof. In some embodiments, the facility device 110 may perform additional functionality other than the functionality described herein. Also, the functionality (or a portion thereof) described herein as being performed by the facility device 110 may be distributed among multiple devices.

The facility communication interface 310 allows the facility device 110 to communicate with devices external to the facility device 110. For example, as illustrated in FIG. 1, the facility device 110 may communicate with the end point devices 105, the fixtures 107, the server 115, the user device 120, the BACnet gateway device 122, or a combination thereof through the facility communication interface 310. The facility communication interface 310 may include a port for receiving a wired connection to an external device (for example, a USB cable and the like), a transceiver for establishing a wireless connection to an external device (for example, over one or more communication networks 140, such as the Internet, a LAN, a WAN, such as a LoRa system, and the like), or a combination thereof.

The facility electronic processor 300 is configured to access and execute computer-readable instructions ("software") stored in the facility memory 305. The software may include firmware, one or more applications, program data, filters, rules, one or more program modules, and other executable instructions. For example, the software may include instructions and associated data for performing a set of functions, including the methods described herein.

In some embodiments, the facility device 110 serves as a gateway or intermediary device that receives data and forwards the data to another component for processing. As one example, in some embodiments, the facility device 110 receives fixture data from the electronic processors 200 of one or more of the end point devices 105 and forwards the collected data to another component for processing, such as the server 115, the user device 120, or a combination thereof. Accordingly, in some embodiments, the facility device 110 forwards the data to a remote server (for example, the server 115) for virtual processing. As another example, in some embodiments the facility device 110 receives processed data (for example, fixture data processed by the server 115) from a remote server (for example, the server 115) and forwards the processed data to another component, such as the BACnet gateway device 122, for further processing, such as converting the processed data from LoRa to BACnet (as described in greater detail below). As noted above, in some embodiments, the functionality (or a portion thereof) described as being performed by the facility device 110 may be performed by another remote device or server (not shown).

Returning to FIG. 1, the server 115 and the user device 120 are computing devices, such as a desktop computer, a laptop computer, a tablet computer, a terminal, a smart telephone, a smart television, a smart wearable, or another suitable computing device that interfaces with a user. Although not illustrated in FIG. 1, the server 115 and the user device 120 may include similar components as the facility device 110, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

In some embodiments, the server 115 may include multiple electronic processors, multiple memory modules, multiple communication interfaces, or a combination thereof. Also, it should be understood that the functionality described herein as being performed by the server 115 may be performed in a distributed nature by a plurality of computing devices (or servers) located in various geographic locations. For example, the functionality described herein as being performed by the server 115 may be performed by a plurality of computing devices included in a cloud computing environment.

The server 115 is configured to monitor and manage one or more facilities (for example, individual restrooms or entire buildings), including the fixtures 107 therein. In some embodiments, the server 115 (via an electronic processor of the server 115) may receive fixture data from the facility device 110. In response to receiving the fixture data, the server 115 may process the fixture data in order to determine usage information or patterns associated with the one or more facilities, including the fixtures 107 thereof. The server 115 may store the usage information or patterns in, for example, a memory of the server 115. Alternatively or in addition, the server 115 may transmit the usage information or patterns to a remote device for storage.

A user may interact with and access data associated with one or more facilities, such as one or more of the fixtures 107 therein (for example, the usage information or patterns determined by the server 115). The user device 120 may be used by an end user, such as a facility entity, to monitor and manage a facility (a single restroom or multiple restrooms in a building), one or more fixtures 107 of a facility, or a combination thereof. For example, a user may access and interact with the data determined by the server 115 to view and understand usage patterns, which may allow a facility entity or maintainer insights into, for example, how to optimize cleaning and maintenance schedules, whether there is a need for additional facilities, end point devices, or a combination thereof. For example, to communicate with the server 115 (i.e., the usage information or patterns determined by the server 115), the user device 120 may store a browser application or a dedicated software application executable by an electronic processor for interacting with the server 115.

The BMS 123 is a building management system (or building automation system) associated with a building (or structure), one or more facilities within the building, or a combination thereof. In some embodiments, the BMS 123 may be associated with multiple buildings or structures associated with a single location (for example, an airport campus, a corporation's campus, or the like). However, in other embodiments, the BMS 123 is associated with multiple buildings or structures associated with multiple related locations. The BMS 123 may be a computer-based control system that controls and monitors mechanical equipment, electrical equipment, and the like associated with a building (or structure). As one example, the BMS 123 may include ventilation, lighting, power systems, fire systems, security systems, and the like. The BMS 123, including the subsystems included therein, communicate via BACnet communication protocol(s). As noted above, in some embodiments, the BMS 123 may be associated with one or more particular vendors. As one example, the BMS 123 may include a ventilation system associated with "Vendor A" and a security system associated with "Vendor B." In some embodiments, data associated with the BMS 123 may be accessible to a user via a vendor specific dashboard (for example, a BMS dashboard), such as a browser application or dedicated software application designed by a particular vendor.

Figure 4:
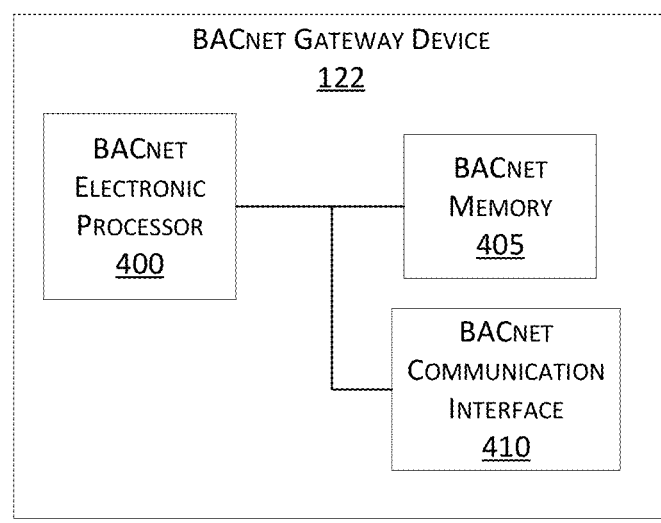
FIG. 4 schematically illustrates a BACnet gateway device included in the system of FIG. 1 according to some embodiments.

As seen in FIG. 1, the BMS 123 may communicate with one or more components of the system 100 via the BACnet gateway device 122. As seen in FIG. 4, the BACnet gateway device 122 includes a BACnet electronic processor 400, a BACnet memory 405, and a BACnet communication interface 410. The BACnet electronic processor 400, the BACnet memory 405, and the BACnet communication interface 410 communicate wirelessly, over one or more communication lines or buses, or a combination thereof. The BACnet gateway device 122 may include additional, different, or fewer components than those illustrated in FIG. 4 in various configurations. For example, in some embodiments, the BACnet gateway device 122 includes a human-machine interface for interacting with a user. The human machine interface may include one or more input devices, one or more output devices, or a combination thereof. In some embodiments, one or more components of the BACnet gateway device 122 may be distributed among multiple devices, integrated into a single device, or a combination thereof. In some embodiments, the BACnet gateway device 122 may perform additional functionality other than the functionality described herein. Also, the functionality (or a portion thereof) described herein as being performed by the BACnet gateway device 122 may be distributed among multiple devices.

The BACnet communication interface 410 allows the BACnet gateway device 122 to communicate with devices external to the BACnet gateway device 122. For example, as illustrated in FIG. 1, the BACnet gateway device 122 may communicate with the end point devices 105, the fixtures 107, the server 115, the user device 120, the BMS 123, or a combination thereof through the BACnet communication interface 410. The BACnet communication interface 410 may include a port for receiving a wired connection to an external device (for example, a USB cable and the like), a transceiver for establishing a wireless connection to an external device (for example, over one or more communication networks 140, such as the Internet, a LAN, a WAN, such as a LoRa system, and the like), or a combination thereof.

The BACnet electronic processor 400 is configured to access and execute computer-readable instructions ("software") stored in the BACnet memory 405. The software may include firmware, one or more applications, program data, filters, rules, one or more program modules, and other executable instructions. For example, the software may include instructions and associated data for performing a set of functions, including the methods described herein.

In some embodiments, the BACnet gateway device 122 serves as a gateway or intermediary device that receives data and forwards the data to another component for processing. As one example, in some embodiments, the BACnet gateway device 122 receives processed fixture data (as processed by the server 115) from the facility device 110 and converts the processed fixture data to a communication protocol, such as a BACnet communication protocol, associated with the BMS 123 (for example, from LoRa to BACnet). After converting the processed fixture data, the BACnet gateway device 122 may forward the converted fixture data to the BMS 123 (or another component of the system 100). In some embodiments, the BMS 123 enables a user of the BMS 123 to access and interact with the converted fixture data via the BMS dashboard, which may be specific to one or more vendors (as noted above). In some embodiments, the BACnet gateway device 122 may receive the processed fixture data from another component of the system 100, such as the server 110, the user device 120, or the like. Accordingly, as one example, the BACnet gateway device 122 may receive the processed fixture data directly from the server 110 (post-processing of the fixture data by the server 110).

Figure 5:
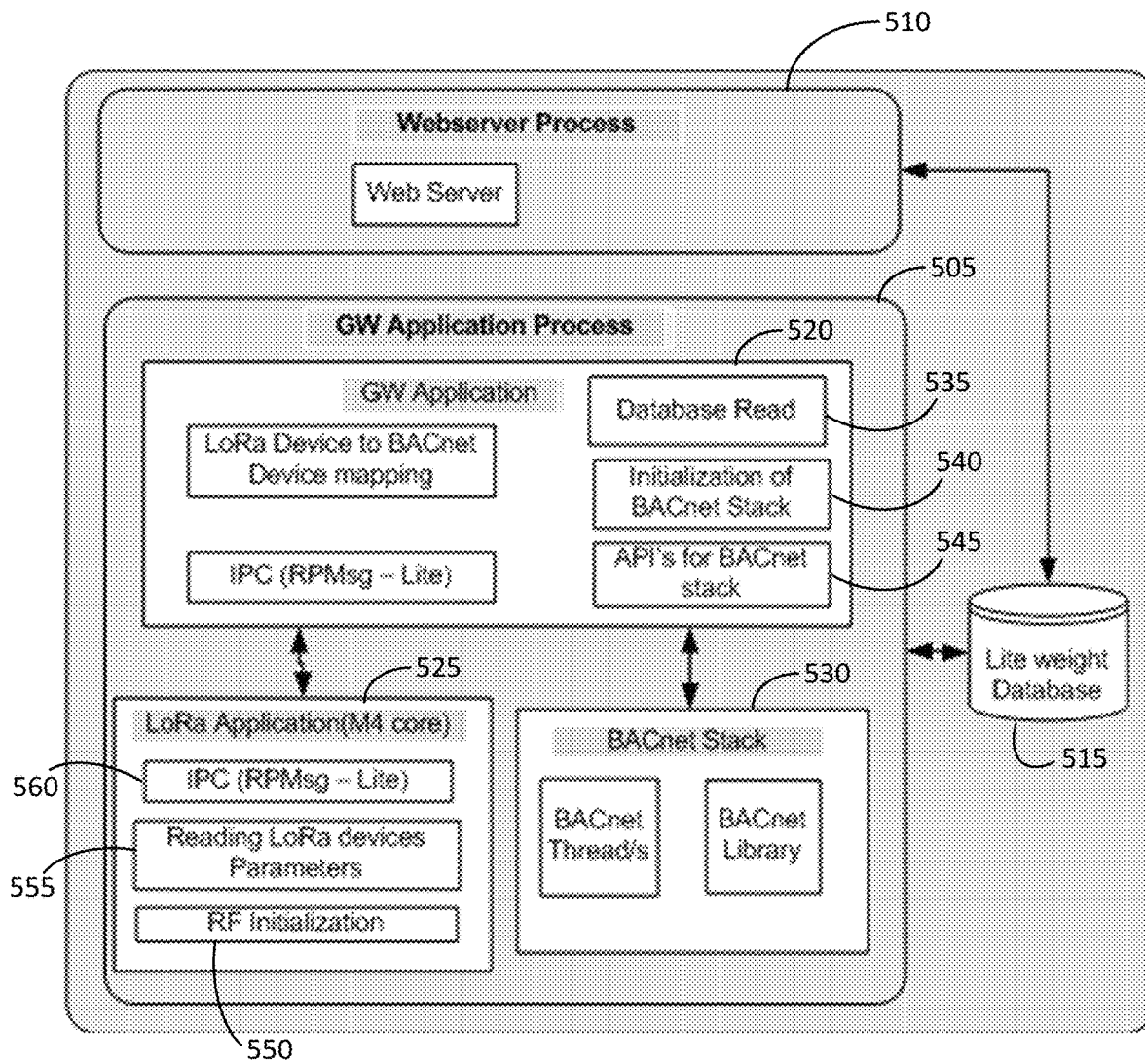
FIG. 5 illustrates an example software architectural diagram for the BACnet gateway device of FIG. 4 according to some embodiments.
Figure 6:
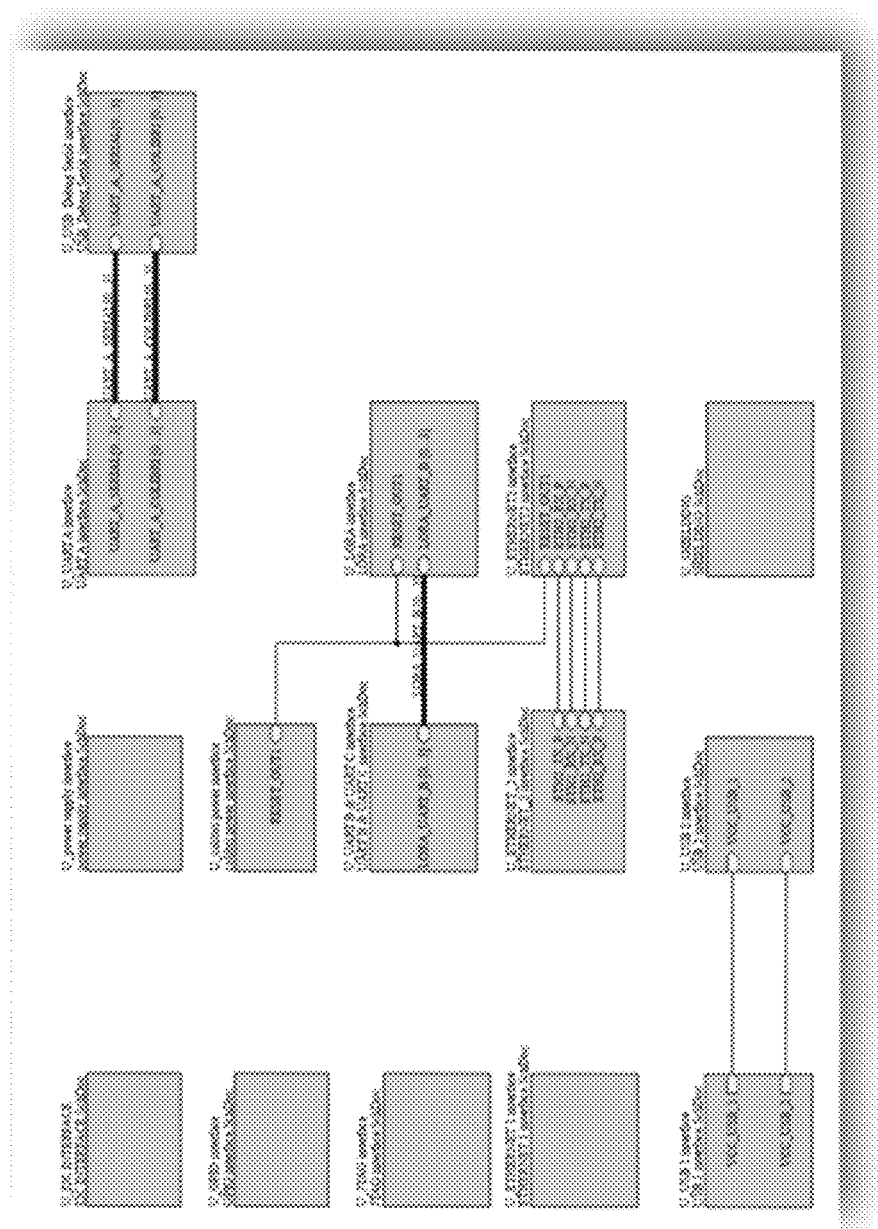
FIG. 6 illustrates an example block diagram of the BACnet gateway device of FIG. 4 according to some embodiments.

FIG. 5 illustrates an example software architectural diagram for the BACnet gateway device 122 according to some embodiments. FIG. 6 illustrates an example block diagram of the BACnet gateway device 122 according to some embodiments. As seen in FIG. 5, the BACnet gateway device 122 executes or performs a gateway application process (represented by reference numeral 505 in FIG. 5), a web server application process (represented by reference numeral 510 in FIG. 5), or a combination thereof, which both access to a database 515 (for example, a lite weight database). In some embodiments, a web UI interface is provided to a user (for example, via the user device 120). The web UI interface may be used to set, for example, network parameters, BACnet stack configuration, LoRa to BACnet parameter mapping, and the like. As seen in FIG. 5, in some embodiments, the gateway application process 505 is divided into three main parts: a gateway application 520, a BACnet stack 525, and a LoRa Application 530. In some embodiments, the gateway application 520 reads configuration settings from the database 515 (represented by reference numeral 535), initializes the BACnet stack 530 (represented by reference numeral 540), registers APIs for a LoRa callback handler (represented by reference numeral 545), updating the BACnet stack 530 with a LoRa device, and the like. In some embodiments, the LoRa application 525 initializes an RF module (represented by reference numeral 550), read parameters value received from a LoRa gateway, such as the facility device 110 (represented by reference numeral 555), initialize RPMSg communication (represented by reference numeral 560), send LoRa device parameters to the BACnet stack 530, or the like. In some embodiments, the BACnet stack 530 provides the software API(s) to update device parameter values, BACnet services over ethernet, and the like.

Figure 7A:
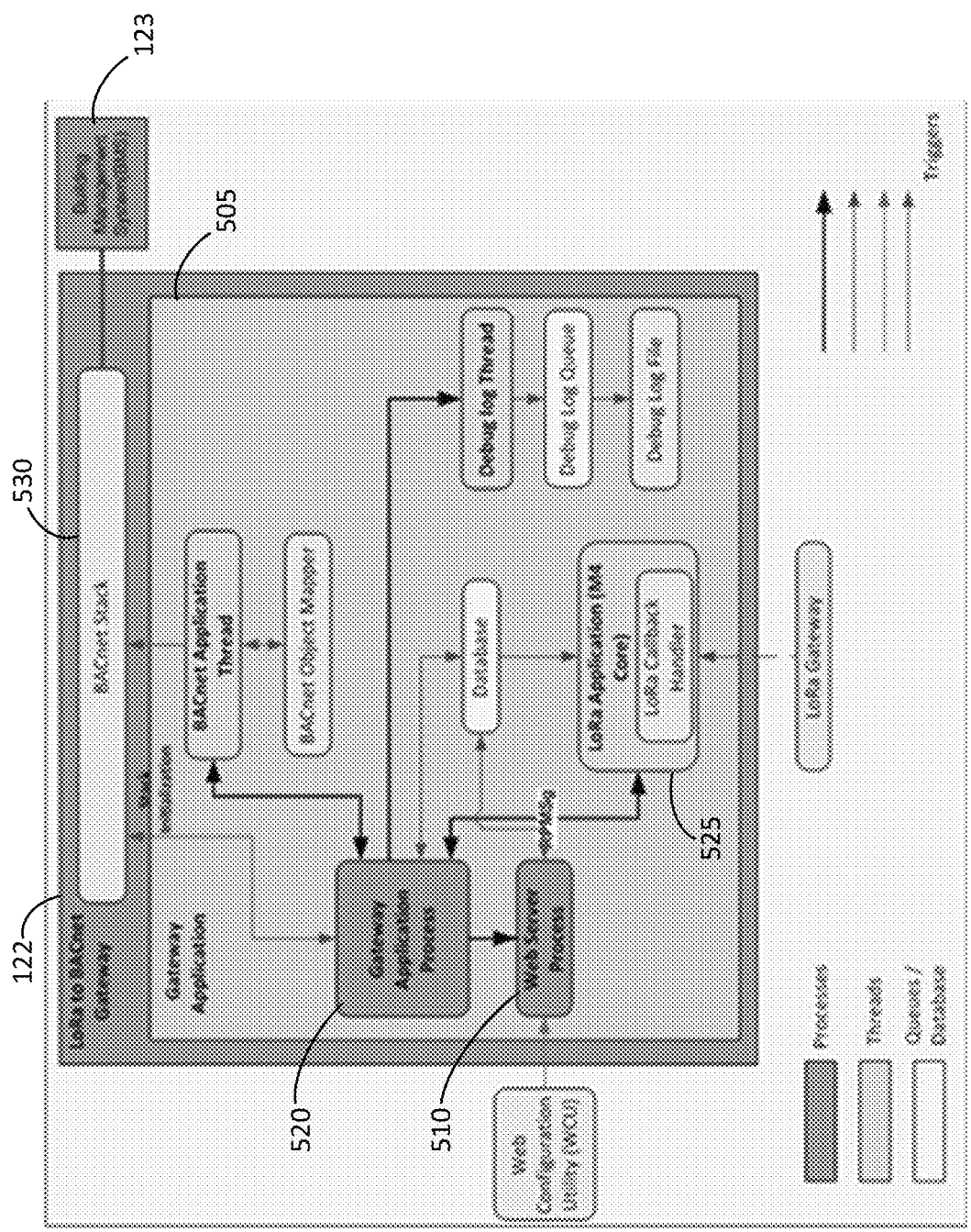
FIG. 7A illustrates an example software diagram for the gateway application performed by the BACnet gateway device according to some embodiments.
Figure 7B:
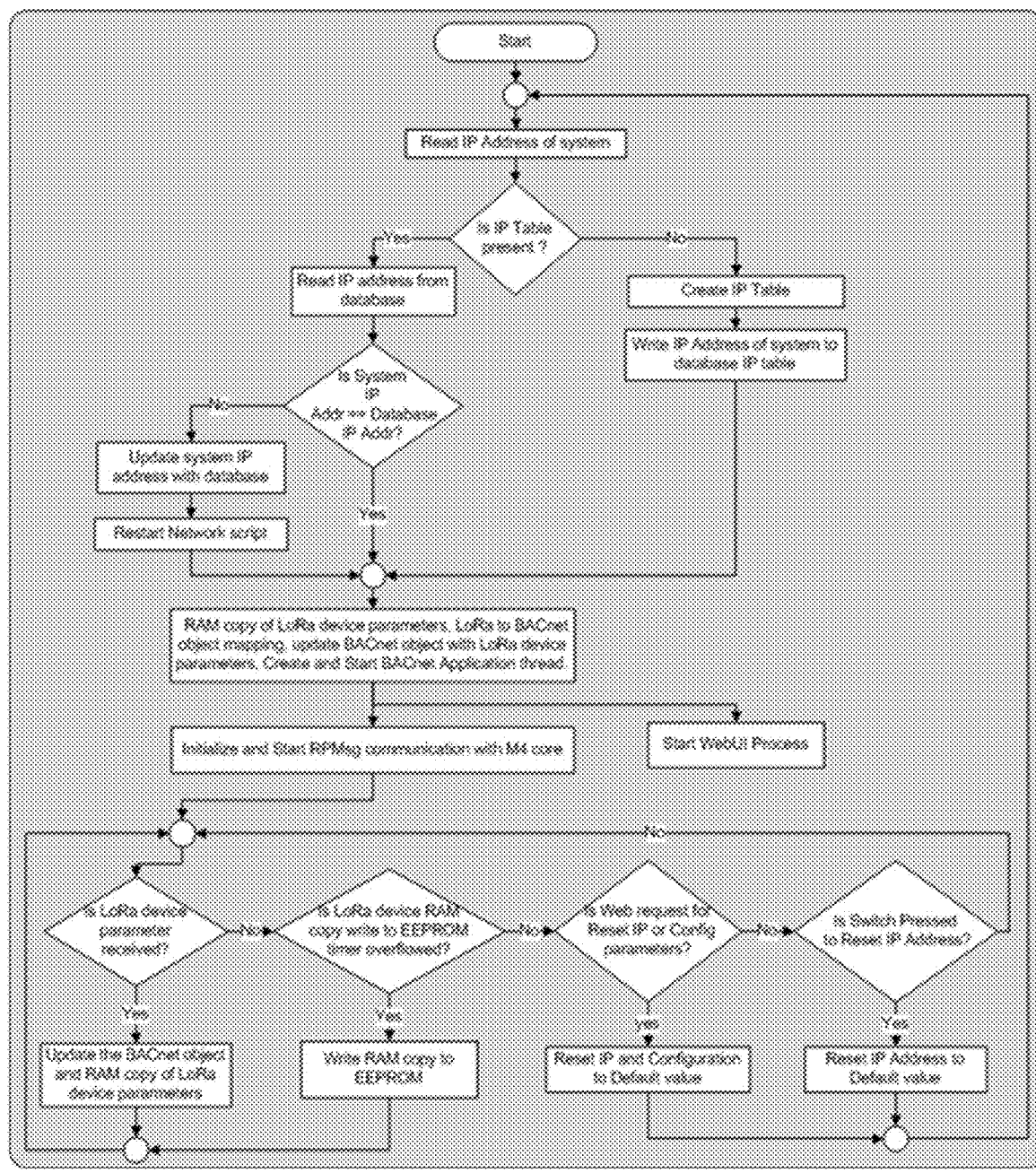
FIG. 7B is a flowchart illustrating example functionality performed by the gateway application according to some embodiments.

FIG. 7A illustrates an example software diagram for the gateway application performed by the BACnet gateway device 122 according to some embodiments. FIG. 7B is a flowchart illustrating example functionality performed by the gateway application according to some embodiments. In the example illustrated in FIG. 7A, the BACnet gateway application includes a gateway application process, a web server process, a BACnet application thread, a LoRa application, and a debug log thread. In some embodiments, the gateway application process is the main process executed by the BACnet gateway device 122 upon power ON. The gateway application process performs an IP acquisition function, BACnet stack initialization function (as per the database and EEPROM settings), a create thread function (for handling RPMSg communication, EEPROM read write operation, hardware switch functionality and RTC functionality), a process function (for the IPC commands for JSON file, update parameters, delete device, or the like), RPMSg communication with M4 core, EEPROM read and write operations (to store LoRa device parameters present value), reset network settings to default when hardware switch is pressed (including, for example, run time adoption of network and DACdel stack settings, syncing RTC and system time with NTP, and the like). The web server process may perform Http client communication, writing parameters into the database, and the like. The BACnet application thread parses the data received over RPMsg channel from M4 and set into the BACdel stack and the database. The LoRa application may run on cortex—M4 core. Alternatively or in addition, the LoRa application may handle LoRa RF communication and IPC using RPMsg framework, send received data to A7, and the like. The debug log thread receives errors from other modules and creates a debug log file (for example, when the debug log file creation option is enabled). Alternatively or in addition, the debug log thread generates logs upon errors as well as debug/information logs based on the log level set.

Figure 8A:
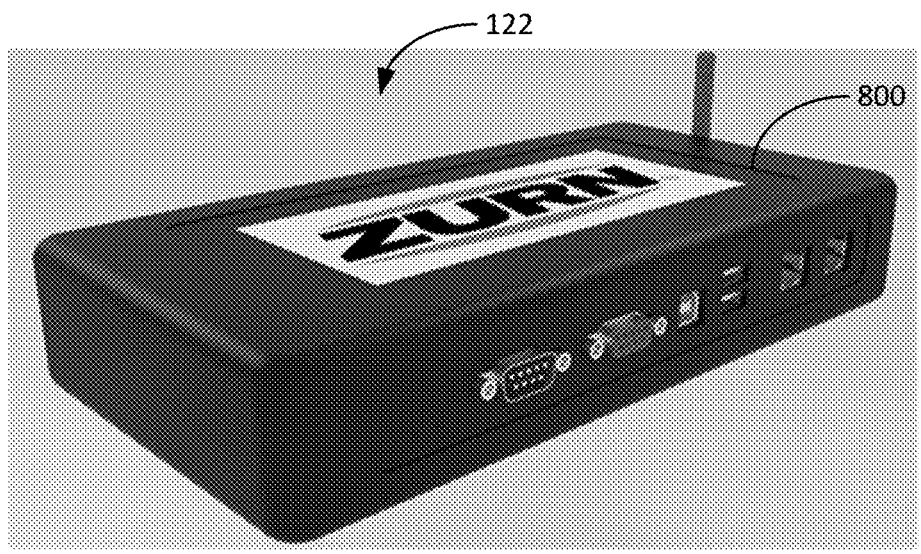
FIGS. 8A-8B illustrate an example housing for the BACnet gateway device of FIG. 4 according to some embodiments.
Figure 8B:
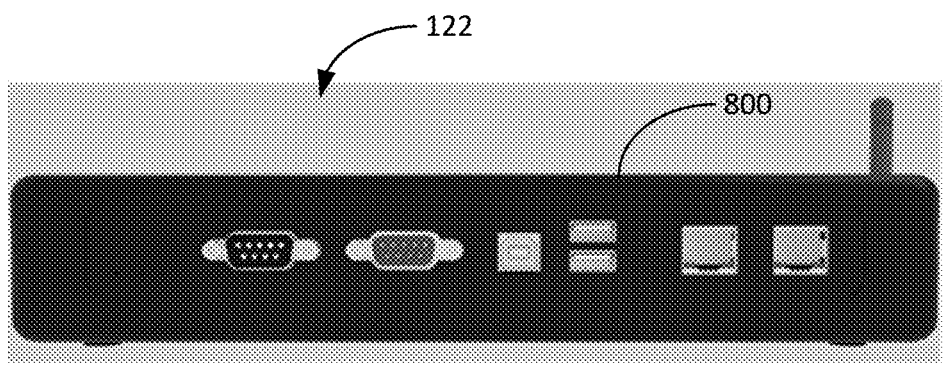

FIGS. 8A-8B illustrate an example housing 800 for the BACnet gateway device 122 according to some embodiments. As seen in FIGS. 8A-8B, in some embodiments, the BACnet gateway device 122 includes two Ethernet ports with 10/100 mbps speed, one RS232 port, two USB 2.0 high-speed interfaces. In some embodiments, the BACnet gateway device 122 includes a CPU model having an ARM cortex-A7 CPU with 2 cores and ARM cortex-M4 with 1 cores, a CPU frequency of, for example, 1 GHz (A7), 200 MHz (M4), or the like, a 32-bit architecture, a RAM size of 1 GB (DDR3L), and a flash memory of 4 GB (eMMC NAND Flash). Alternatively or in addition, in some embodiments, with respect to communication interfaces, the BACnet gateway device 122 includes two ethernet ports one for web UI & BMS and another reserved for future implementation(s). The BACnet gateway device 122 may include two USB 2.0 High-Speed interfaces, one B type interface and two RS232 interface.

Figure 9:
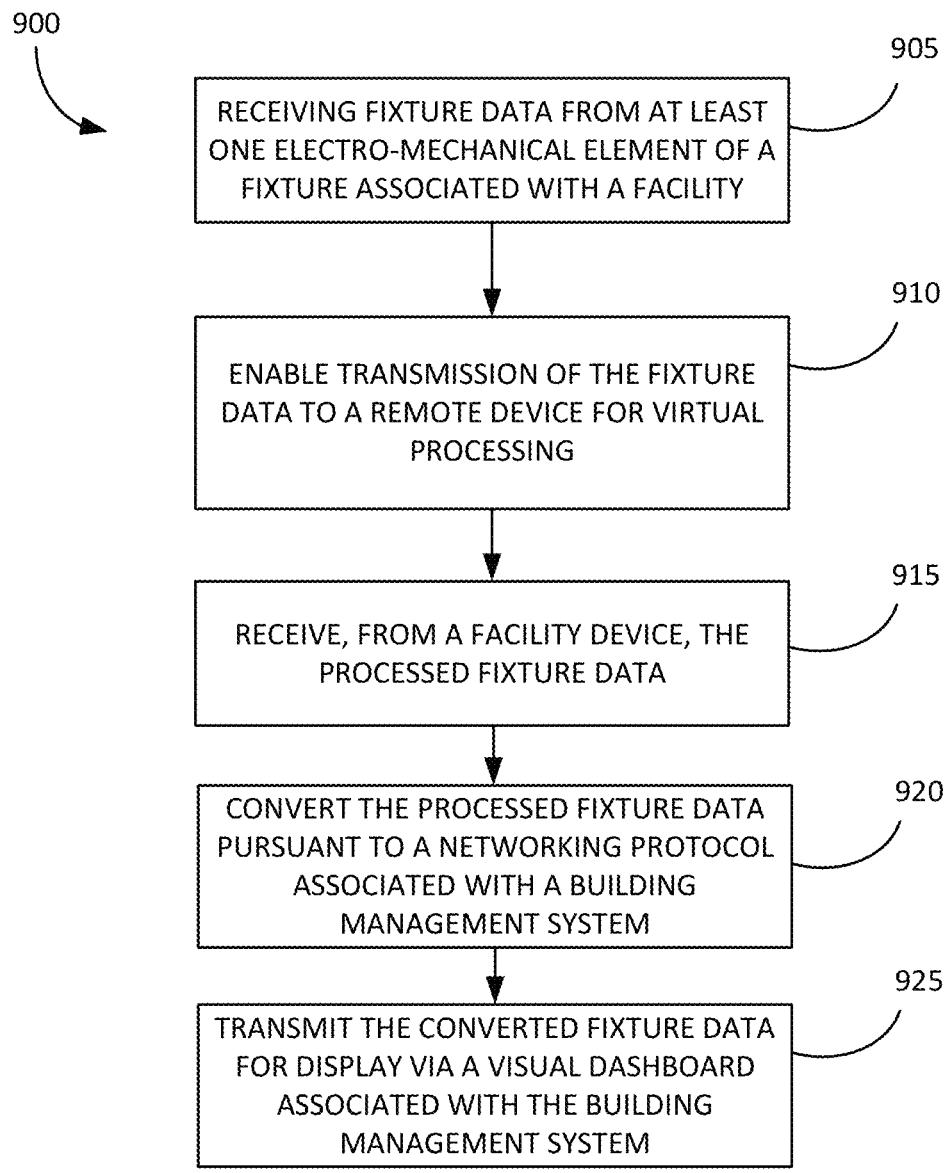
FIG. 9 is a flowchart illustrating a method for monitoring and managing a facility having a plurality of end point devices performed by the system of FIG. 1 according to some embodiments.
Figure 10:
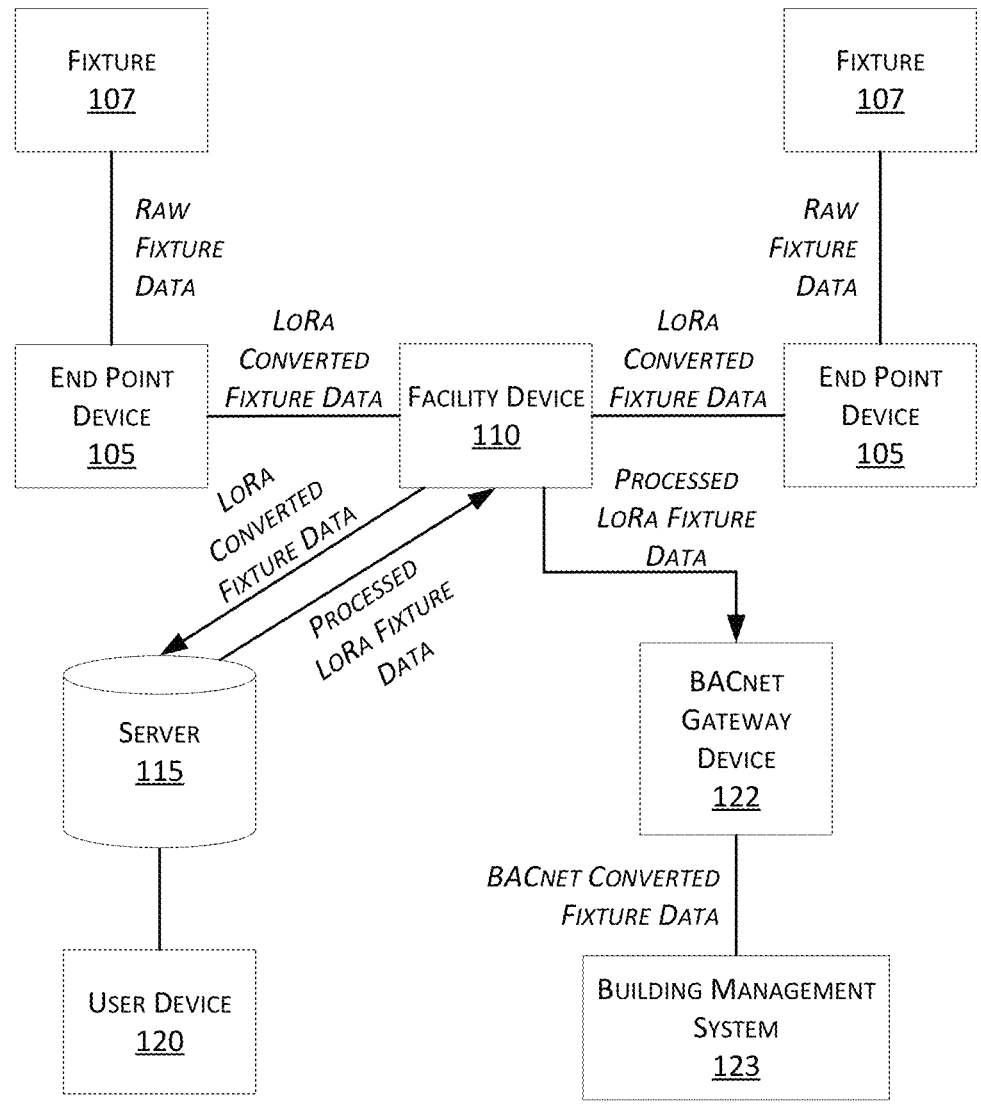
FIG. 10 schematically illustrates communication between components of the system of FIG. 1 according to some embodiments.

FIG. 9 is a flowchart illustrating a method 900 for monitoring and managing a facility according to some embodiments. The method 900 will be described with reference to FIG. 10. FIG. 10 schematically illustrates communication between components of the system 100 according to some embodiments.

As seen in FIG. 9, the method 900 includes receiving fixture data from at least one EM element 125 of the fixture 107 associated with the facility (at block 905). As noted above, the EM elements 125 of the fixture 107 are configured to monitor and/or influence the operation of the fixture 107. Accordingly, in some embodiments the fixture data for a particular fixture 107 is collected by the EM element(s) 125 associated with that particular fixture 107. As also noted above, there is a communication link between the fixture 107 and the end point device 105. In some embodiments, the fixture data collected by the EM elements 125 of the fixture 107 is transmitted to the end point device 105 via the communication link.

In some embodiments, the fixture data is converted pursuant to a specific networking protocol consistent with a network connection between one or more components of the system 100. For example, the end point device 105, the facility device 110, and the server 115 may communicate via LoRa networking or communication protocols. Accordingly, as one example, the electronic processor 200 of the end point device 105 may convert the fixture data pursuant to LoRa networking protocols for transmission over a LoRa connection between the end point device 105 and the facility device 110. With reference to FIG. 10, in some embodiments, the fixture(s) 107 transmit "raw" fixture data to the end point device(s) 105. In response to receiving the raw fixture data, the end point device(s) 105 convert the "raw" fixture data pursuant to a specific networking protocol (in this example, a LoRa protocol).

As seen in FIG. 9, the method 900 also includes enabling transmission of the fixture data to a remote device for virtual processing (at block 910). For example, in some embodiments, the electronic processor 200 of the end point device 105 transmits the LoRa converted fixture data for virtual processing over a network associated with the networking protocol. As described above, the electronic processor 200 may transmit the LoRa converted fixture data to the facility device 110 (as a gateway device). For example, as illustrated in FIG. 10, the end point device(s) 105 transmit the LoRa converted fixture data to the facility device 110. In some embodiments, the end point device 105 (for example, the electronic processor 200) maintains a backlog of data packets (for example, the LoRa converted data) until a connection to, for example, the facility device 110 is available (for example, in the event that a connection to the facility device 110 is temporarily unavailable). The facility device 110 may then forward the LoRa converted fixture data to a remote device, server, or database for virtual processing in the cloud, such as, for example, the server 115, the user device 120, or a combination thereof (as seen in FIG. 10). As one example, a user may use the user device 120 (or another remote device) to access and interact with the data. The user may view and interact with usage patterns, which may allow a facility entity or maintainer insights into, for example, how to optimize cleaning and maintenance schedules (for example, for preventative or predicted maintenance), whether there is a need for additional facilities, end point devices, or a combination thereof, and the like. As noted above, in some embodiments, the server 115 is configured to monitoring and managing one or more facilities, including the fixtures 107 therein. In some embodiments, the server 115 (via an electronic processor of the server 115) may receive fixture data (for example, the LoRa converted fixture data) from the facility device 110. In response to receiving the fixture data, the server 115 may process the fixture data in order to determine usage information or patterns associated with the one or more facilities, including the fixtures 107 thereof. Alternatively or in addition, in some embodiments, the server 115 may monitor or track a battery or power level (for example, as a battery condition or characteristic) associated with the end point device 105.

As one example, where the fixture 107 is a faucet, the server 115 may analyze the fixture data to monitor the communications between the EM elements 125 of a fixture 107 (for example, a sensor and an actuator) to track, among other things, the number of "ON" and "OFF" signals (or activations). Alternatively or in addition, the server 115 may analyze the fixture data to detect the flow of water by monitoring temperature data from a temperature sensor (as an EM element 125 of the fixture 107) either positioned within the drain or the faucet itself. Alternatively or in addition, the server 115 may analyze the fixture data to determine when a run-on condition has occurred in response to determine that a predetermined period of time set by a user is exceeded and the faucet did not return to an "OFF" condition or water flow is still detected. Alternatively or in addition, the server 115 may analyze the fixture data to calculate water usage indirectly based at least in part on a duration of time that the valve of the faucet remains open and an estimated water flow rate.

As yet another example, where the fixture 107 is a flush valve, the server 115 may analyze the fixture data to monitor a magnitude of a voltage and/or current supplied to the EM element 125 (for example, an actuator) of the fixture 107 to track when a flushing event has been initiated. Alternatively or in addition, the server 115 may analyze the fixture data to determine when an "ON" signal is provided (for example, a person is detected) but no corresponding movement of the valve occurs. In such instances, the server 115 may generate and provide an error signal such that an alert may be generated via, for example, the facility device 110, the user device 120, another component of the system 100, or a combination thereof. Such faults may be detected by detecting an elevated voltage or current rate (for example, motor is bound). Alternatively or in addition, the server 115 may analyze the fixture data to determine a length of time a person is detected using the fixture 107 on any given instance.

As yet another example, where the fixture 107 is a resource dispenser, the server 115 may analyze the fixture data to monitor a magnitude of a voltage and/or current supplied to an EM element 125 (for example, an actuator) of a fixture 107 to track when a resource dispensing event has occurred. Alternatively or in addition, the server 115 may analyze the fixture data to monitor a level or amount of resource remaining in a reservoir of the fixture 107. The server 115 may calculate an amount of resource remaining in a reservoir of the fixture 107 by subtracting a predetermined volume or amount of resource discharged during a resource dispensing event for each detected activation. In some embodiments, when the server 115 determines that a level or amount of resource remaining in a reservoir of the fixture 107 has fallen below a predetermined amount or level, the server 115 may generate and provide an error signal such that an alert may be generated via, for example, the facility device 110, the user device 120, another component of the system 100, or a combination thereof.

Additionally, in some embodiments, the battery life (for example, an energy level or energy usage) may be monitored using various indicators, such as a graphical representation of a fuel gauge. Alternatively or in addition, in some embodiments, the server 115 (an electronic processor thereof) may generate alerts and warnings in response to detecting a predetermined energy level, where the predetermined energy level indicates an end of battery life scenario, an energy source replacement scenario, and the like. As one example, when the electronic processor of the server 115 detects a predetermined energy level indicating a low energy level, the electronic processor of the server 115 may generate and transmit a low energy level alert to a user of the user device 120 (via, for example, a display device of the user device 120).

Returning to FIG. 9, the method 900 further includes receiving, from the facility device 110 (for example, the first gateway device), the processed fixture data (at block 915). Processed fixture data may include, for example, the insights, usage patterns, alerts, associated data, or the like as determined by the server 115. As seen in FIG. 10, in some embodiments, after processing the LoRa converted fixture data, the server 115 may transmit the processed LoRa fixture data to the facility device 110. In response to receiving the processed LoRa fixture data, the facility device 110 may transmit (or forward) the processed LoRa fixture data to the BACnet gateway device 122. Alternatively or in addition, in some embodiments, the server 115 may transmit the processed LoRa fixture data directly to the BACnet gateway device 122 (not shown).

In response to receiving the processed LoRa fixture data, the BACnet gateway device 122 converts the processed LoRa fixture data pursuant to a networking protocol associated with a building management solution or system (for example, the BMS 123) (at block 920). As noted above, the BMS 123, including the sub-systems included therein, communicate via BACnet communication protocol(s). As noted above, in some embodiments, the BMS 123 may be associated with one or more particular vendors. As one example, the BMS 123 may include a ventilation system associated with "Vendor A" and a security system associated with "Vendor B." In some embodiments, data associated with the BMS 123 may be accessible to a user via a vendor specific dashboard (for example, a BMS or visual dashboard), such as a browser application or dedicated software application designed by a particular vendor. Accordingly, in some embodiments, the BACnetgateway device (via the BACnet electronic processor 400) converts the processed fixture data from a LoRa protocol to a BACnet protocol.

After converting the processed LoRa fixture data, the BACnet gateway device 122 transmits the converted fixture data for display via a BMS or visual dashboard associated with the BMS 123 (at block 925). As seen in FIG. 10, the BACnet gateway device 122 may transmit the converted fixture data (as BACnet converted fixture data) to the BMS 123 (or one or more components therein).

Although not illustrated, the BMS 123 may include one or more computing devices, servers, databases, or other devices. In some embodiments, the BMS 123 includes a computing device (similar to the user device 120). In some embodiments, the computing device (or another component of the BMS 123) integrates the BACnet converted fixture data with additional data from one or more building sub-systems included in the BMS 123. As one example, the computing device (or another component of the BMS 123) integrates the BACnet converted fixture data and the additional data as building data, such that the building data may be displayed to a user via, for example, a BMS or visual dashboard, such that a user may access and interact with the building data. Accordingly, in some embodiments, the computing device (or another component of the BMS 123) may receive a user interaction with the BMS or visual dashboard, where the user interaction is associated with the building data (or a portion thereof). Based on the received user interaction, the computing device (or another component of the BMS 123) may control one or more sub-systems included in the BMS 123, fixtures 107, or the like. As one example, the computing device (or another component of the BMS 123) may generate and transmit, based on the user interaction, a control signal for controlling a building sub-system, one or more fixtures 107, or a combination thereof.

Thus, the embodiments provide, among other things, to methods and systems for monitoring and managing a facility having a plurality of end point device. Various features and advantages of certain embodiments are set forth in the following claims.

What is claimed is:

1. A system for converting water management data for building management solutions, the system comprising:
   a first gateway device associated with a facility;
   a second gateway device communicatively coupled with the first gateway device;
   a fixture associated with the facility and comprising at least one electro-mechanical element and an end point device, the at least one electro-mechanical element communicatively coupled to the end point device and configured to monitor operation of the fixture, the end point device configured to communicate with the first gateway device, the end point device comprising a first electronic processor configured to:
      receive, from the electro-mechanical element, fixture data related to an operation of the fixture; and
      provide the fixture data to the first gateway device;
   wherein the first gateway device comprises a second electronic processor configured to:
      receive the fixture data from the end point device;
      provide the fixture data to a remote device for virtual processing;
      receive processed fixture data from the remote device, wherein the processed fixture data includes usage patterns for the fixture determined based on the provided fixture data;
      convert the processed fixture data pursuant to a first networking protocol associated with the second gateway device; and
      provide, via the first networking protocol, the processed fixture data to the second gateway device;
   wherein the second gateway device comprises a third electronic processor configured to:
      receive, from the first gateway device, the processed fixture data;
      convert the processed fixture data pursuant to a second networking protocol associated with a building management system; and
      provide, via the second networking protocol, the processed fixture data for display via a visual dashboard associated with the building management system.

2. The system of claim 1, wherein the second networking protocol associated with the building management system is a BACnet protocol.

3. The system of claim 1, wherein the first networking protocol associated with the second gateway device is a Long Range (LoRa) protocol.

4. The system of claim 1, wherein the second gateway device is associated with the building management system.

5. The system of claim 1, wherein the visual dashboard integrates, as building data, the converted fixture data with additional data associated with at least one building subsystem included in the building management solution.

6. The system of claim 5, wherein a building subsystem includes at least selected from a group consisting of a ventilation system, a lighting system, a power system, a fire system, and a security system.

7. The system of claim 5, wherein the processed fixture data and the additional data are associated with the same building.

8. The system of claim 5, wherein the third electronic processor is further configured to:
transmit the processed fixture data to a computing device associated with the building management system.

9. The system of claim 8, wherein the computing device is configured to display the building data via the visual dashboard associated with the building management system.

10. The system of claim 9, wherein the computing device is configured to:
receive, via the visual dashboard, a user interaction associated with the building data, and
generate and transmit, based on the user interaction, a control signal associated with at least one selected from a group consisting of the at least one building subsystem and the fixture.

11. The system of claim 1, wherein the fixture is a water management solution associated with the facility.

12. The system of claim 1, wherein the remote device comprises a central cloud-based database.

13. The system of claim 1, wherein the at least one electro-mechanical element comprises an actuator, a flow sensor, a position sensor, a proximity sensor, or a thermocouple.

14. The system of claim 1, wherein the at least one electro-mechanical element is communicatively coupled to the end point device via a wired connection.

15. The system of claim 14, wherein the wired connection comprises a universal serial bus (USB) cable.

16. The system of claim 1, wherein the end point device is configured to communicated directly with the first gateway device, and wherein the first gateway device receives the fixture data directly from the end point device.

17. The system of claim 1, wherein the first electronic processor of the end point device is further configured to:
before receiving the fixture data, remain in a sleep mode until an action or operation is detected with respect to the fixture.

18. The system of claim 1, wherein the first electronic processor of the end point device is further configured to:
before providing the fixture data to the first gateway device, maintain a backlog of data packets comprising the fixture data until a connection to the first gateway device is available.

19. The system of claim 1, wherein the fixture data is provided to the first gateway device by the end point device through an adaptable data rate that automatically selects an available channel without a search for the channel.

* * * * *